(12) United States Patent
Hampton

(10) Patent No.: US 11,257,249 B2
(45) Date of Patent: Feb. 22, 2022

(54) ENSURING CORRECT PORTABLE SENSOR PLACEMENT

(71) Applicant: Baker Hughes Oilfield Operations LLC, Houston, TX (US)

(72) Inventor: Aaron R. Hampton, Minden, NV (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 176 days.

(21) Appl. No.: 16/671,157

(22) Filed: Oct. 31, 2019

(65) Prior Publication Data
US 2021/0134006 A1    May 6, 2021

(51) Int. Cl.
  G06T 7/73      (2017.01)
  G06F 3/04842   (2022.01)
  G06T 7/00      (2017.01)

(52) U.S. Cl.
  CPC ............ G06T 7/74 (2017.01); G06F 3/04842 (2013.01); G06T 7/001 (2013.01); G06T 2207/20104 (2013.01); G06T 2207/30164 (2013.01)

(58) Field of Classification Search
  CPC .................................. G06T 7/74; G06T 7/001
  See application file for complete search history.

(56) References Cited

U.S. PATENT DOCUMENTS

| | | | |
|---|---|---|---|
| 5,881,163 A * | 3/1999 | Slump .................... | H04N 5/32 382/132 |
| 8,924,163 B2 | 12/2014 | Hudson et al. | |
| 9,459,176 B2 | 10/2016 | Piety et al. | |
| 9,772,219 B2 | 9/2017 | Hedin | |
| 9,921,136 B2 | 3/2018 | Wascat et al. | |
| 2019/0364186 A1 * | 11/2019 | Park ................... | H04N 5/35563 |

OTHER PUBLICATIONS

FALCON. Datasheet [online]. OneProd, Feb. 2018 [retrieved on Sep. 26, 2018]. Retrieved from the Internet: <URL:www.oneprod.com/wp-content/uploads/2018/04/COM3018-April-2018-E-FALCON-Brochure-EN.pdf>.

"Location!Location!Location! Vibration Sensor Placement Is Crucial," Blog [online]. Ludeca, Jun. 24, 2014 [retrieved an Sep. 26, 2018]. Retrieved from the Internet: <URL:ludeca.com/blog/maintenance-tips/5399/location-location-location-vibration-sensor-placement-is-crucial/>.

* cited by examiner

*Primary Examiner* — Tuan H Nguyen
(74) *Attorney, Agent, or Firm* — Mintz Levin Cohn Ferris Glovsky and Popeo, PC; Lisa Adams

(57) ABSTRACT

A first image including a first sensor placed on a target can be recorded at a first resolution. Using an accelerometer, an orientation of the first image can be determined concurrently with recording of the first image. The orientation of the first image can be associated with an orientation of the first sensor placed on the target within the first image. A user input indicating a boundary surrounding the first sensor in a portion of the first image can be received via a graphical user interface (GUI). The orientation of the first sensor within the first image can be compared with a predetermined reference orientation and a determination made whether the orientation of the first sensor within the first image matches the predetermined reference orientation. When the orientation of the first sensor within the first image matches the predetermined reference orientation, a confirmation can be output via the GUI.

21 Claims, 8 Drawing Sheets

ENSURING CORRECT PORTABLE SENSOR PLACEMENT

BACKGROUND

Some environments, such as industrial environments, can employ machinery that includes moving components (e.g., rotating components, reciprocating components, etc.). Under some circumstances, moving components can result in vibration of the machinery. When vibrations are unintentional, they can lead to machine damage over time, such as wear. It can be desirable to monitor vibrations of a machine in order to assess the condition or health of the machine in order to identify vibration-related problems that are developing. In some cases, vibration monitoring can predict problems before they arise. In either case, vibration monitoring can facilitate prevention of vibration-related damage and/or performance of maintenance to correct vibration-related damage prior to breakdown.

Vibration monitoring can include collecting measurements from a sensor mounted to the machine. The sensor can be designed to detect movement of one or more components relative to the sensor and can transmit information characterizing detected movements to other electronics, such as a computer processor, for analysis.

Under some circumstances, vibration sensors can be mounted to a machine in a temporary fashion. As an example, some machines can require vibration monitoring on an infrequent basis. Because a permanently installed vibration sensor could be underutilized under this circumstance, it can be desirable to use a portable vibration sensor that is temporarily attached to different machines. However, it can be difficult to consistently position a portable sensor on a machine, especially when different individuals are positioning the portable sensor over the lifetime of the machine. Positioning the sensor can have an impact on the reading from the sensor, and inconsistent positioning can be falsely attributed to machinery vibration changes.

SUMMARY

Systems and methods are provided for consistently mounting a removable sensor to one or more monitored machines in an operating environment, such as an industrial environment. Consistently mounting a sensor on a machine can include placing the sensor substantially in the same location on a machine in substantially the same orientation. A removable sensor can be removably mounted on a machine. Removably mounting a sensor on a machine can include temporarily mounting the sensor on the machine, collecting a measurement from the sensor, and unmounting the sensor from the machine. The location the sensor is mounted on the machine, or sensing location, can have an effect on the accuracy of the sensor reading. For example, an inch variation in sensing location between respective sensor readings can lead to noticeable differences in respective measurements collected from the sensor. These differences can result from inconsistent placement of the sensor on the machine. However, they can be incorrectly attributed to changes in the machine's condition. And since the sensor can be removably mounted, it can be cumbersome to reliably mount a sensor in the same sensing location when repeating a measurement at a later time, or when mounted by different personnel.

A sensor placement system can guide a user through sensor measurement collection from the monitored machines. The monitored machines can be included in route navigated by the user. The route navigated by the user can include one or more machines monitored by an asset monitoring system and from which sensor measurement collection can be desirable. At each machine, the user can removably mount the sensor at specified sensing locations on the machine. At each sensing location on the machine, the sensor can be placed in one or more sensing orientations. A sensing orientation can include a position and direction of the sensor relative to the machine. By ensuring correct sensor placement on each machine from which sensor measurement collection can be desired, sensor measurement accuracy can be increased and improved asset monitoring systems can be realized.

In an embodiment, a method for consistently mounting a removable sensor to one or more machines is provided. The method can include recording, using a camera, a first image at a first resolution that includes a first sensor placed on a target. The method can also include determining, using an accelerometer, an orientation of the first image concurrently with the recording of the first image, wherein the orientation of the first image is associated with an orientation of the first sensor placed on the target within the first image. The method can further include receiving, via a graphical user interface (GUI), a user input indicating a boundary surrounding the first sensor in a portion of the first image. The method can additionally include comparing the orientation of the first sensor within the first image with a predetermined reference orientation. The method can also include determining whether the orientation of the first sensor within the first image matches the predetermined reference orientation. The method can further include storing, in a memory in response to determining that the orientation of the first sensor matches the predetermined reference orientation, a first sub-image derived from the first image, a second sub-image derived from the first image, and the orientation of the first sensor, wherein the first sub-image includes the portion of the first image surrounded by the boundary at the first resolution, wherein the second sub-image is the first image at a second resolution less than the first resolution. The method can additionally include outputting, via the GUI, a confirmation that the orientation of the first sensor within the first image matches the predetermined reference orientation.

In another embodiment, the method can include displaying, by the GUI, a boundary that provisionally identifies the sensor within the first image. The boundary can be generated automatically (e.g., based upon a machine analysis of the first image). After displaying the boundary, the GUI can further display a prompt requesting the user to confirm whether the sensor is present within the image.

In another embodiment, the method can include receiving, from the memory, the first sub-image, the second sub-image, and the orientation of the first sensor. The method can also include recording, using the camera, a second image, the second image including a second sensor placed on the target. The method can further include comparing the second image to the first sub-image and the second sub-image. The method can additionally include determining whether the second image matches the first sub-image and the second sub-image. The method can also include determining, in response to determining that the second image matches the first sub-image and the second sub-image, that an orientation of the second sensor matches the orientation of the first sensor. The method can further include outputting, via the graphical user interface, a confirmation that the orientation of the second sensor matches the orientation of the first sensor.

In another embodiment, the method can include recording, using the second sensor, a measurement of the target and storing, in the memory, the recorded measurement.

In another embodiment, the method can include identifying a portion of the second image including the second sensor, comparing the identified portion of the second image with the first sub-image, and determining that the identified portion of the second image matches the first sub-image.

In another embodiment, the method can include displaying, via the graphical user interface, a prompt for the user to record the first image including the first sensor placed on the target in response to determining that the orientation of the first image does not match the predetermined reference orientation.

In another embodiment, the method can include, prior to the recording operation, receiving, via a radio frequency identification reader, a unique identifier of the target from a radio frequency identification tag corresponding to the target. The method can also include receiving, from the memory, the predetermined reference orientation associated with the unique identifier. The method can further include determining that the first image is not present in the memory. The method can additionally include outputting, via the GUI, a prompt to record the first image in response to determining that the first image is not present in the memory.

In another embodiment, the method can include identifying, using wavelet analysis, mean-squared error, and scale-invariant feature transforms, the first sensor in the first image.

In an embodiment, a system for consistently mounting a removable sensor to one or more machines is provided and can include at least one data processor and a memory. The memory can store instructions which, when executed by the at least one data processor, can perform operations. The operations can include recording, using a camera, a first image at a first resolution, where the first image can include a first sensor placed on a target. The operations can also include determining, using an accelerometer, an orientation of the first image concurrently with the recording of the first image. The orientation of the first image can be associated with an orientation of the first sensor placed on the target within the first image. The operations can further include receiving, via a graphical user interface (GUI), a user input indicating a boundary surrounding the first sensor in a portion of the first image. The operations can additionally include comparing the orientation of the first sensor within the first image with a predetermined reference orientation. The operations can also include determining whether the orientation of the first sensor within the first image matches the predetermined reference orientation. The operations can further include storing, in a memory in response to determining whether the orientation of the first sensor matches the predetermined reference orientation, a first sub-image derived from the first image, a second sub-image derived from the first image, and the orientation of the first sensor. The first sub-image can be the portion of the first image surrounded by the boundary at the first resolution and the second sub-image can be the first image at a second resolution. The second resolution can be less than the first resolution. The operations can additionally include outputting, via the GUI, a confirmation that the orientation of the first sensor within the first image matches the predetermined reference orientation.

In another embodiment, the operations performed by the at least one data processor can further include receiving, from the memory, the first sub-image, the second sub-image, and the orientation of the first sensor. The operations can also include recording, using the camera, a second image, where the second image includes a second sensor placed on the target. The operations can further include comparing the second image to the first sub-image and the second sub-image. The operations can additionally include determining whether that the second image matches the first sub-image and the second sub-image. The operations can also include determining, in response to determining that the second image matches the first sub-image and the second sub-image, that an orientation of the second sensor matches the orientation of the first sensor. The operations can further include outputting, via the GUI, a confirmation that the orientation of the second sensor matches the orientation of the first sensor.

In another embodiment, the operations performed by the at least one data processor can include further recording, using the second sensor, a measurement of the target and storing, in the memory, the recorded measurement.

In another embodiment, the operations performed by the at least one data processor can include identifying a portion of the second image including the second sensor, comparing the identified portion of the second image with the first sub-image, and determining that the identified portion of the second image matches the first sub-image.

In another embodiment, the operations performed by the at least one data processor can include displaying, via the GUI, a prompt for the user to re-record the first image including the first sensor placed on the target in response to determining that the orientation of the first sensor within the first image does not match the predetermined reference orientation In another embodiment, the operations performed by the at least one data processor can include, prior to the recording operation, receiving, via a radio frequency identification reader, a unique identifier of the target from a radio frequency identification tag corresponding to the target. The operations can also include receiving, from the memory, the predetermined reference orientation associated with the unique identifier. The operations can further include determining that the first image is to present in the memory. The operations can additionally include outputting, via the GUI, a prompt to record the first image in response to determining that the first image is not present in the memory.

In another embodiment, the operations performed by the at least one data processor can include identifying, using wavelet analysis, the first sensor in the first image.

In an embodiment, a non-transitory computer program product for consistently mounting a removable sensor to one or more machines is provided and can store instructions. The instructions, when executed by at least one data processor of at least one computing system, can implement operations including recording, using a camera, a first image at a first resolution that includes a first sensor placed on a target. The operations can also include determining, using an accelerometer, an orientation of the first image concurrently with the recording of the first image. The orientation of the first image can be associated with an orientation of the first sensor placed on the target within the first image. The operations can further include receiving, via a graphical user interface (GUI), a user input indicating a boundary surrounding the first sensor in a portion of the first image. The operations can additionally include comparing the orientation of the first sensor within the first image with a predetermined reference orientation. The operations can also include determining whether the orientation of the first sensor within the first image matches the predetermined reference orientation. The operations can further include storing, in a memory in response to determining that the orientation of the first sensor matches the predetermined reference orientation, a first sub-image derived from the image, a second sub-image derived from the image, and the orientation of the first sensor. The first sub-image can include the portion of the first image surrounded by the boundary at the first resolution and the second sub-image can be the first image at a second resolution. The second resolution can be less than the first resolution. The operations can additionally include outputting, via the GUI, a confirmation that the orientation of the first sensor within the first image matches the predetermined reference orientation.

In another embodiment, the operations can include receiving, from the memory, the first sub-image, the second sub-image, and the orientation of the first sensor. The operations can also include recording, using the camera, a second image, the second image including a second sensor placed on the target. The operations can further include comparing the second image to the first sub-image and the second sub-image. The operations can additionally include determining whether the second image matches the first sub-image and the second sub-image. The operations can also include determining, in response to determining that the second image matches the first sub-image and the second sub-image, that an orientation of the second sensor matches the orientation of the first sensor. The operations can further include outputting, via the GUI, a confirmation that the orientation of the second sensor matches the orientation of the first sensor.

In another embodiment, the operations can include recording, using the second sensor, a measurement of the target and storing, in the memory, the recorded measurement.

In another embodiment, the operations can include identifying a portion of the second image including the second sensor, comparing the identified portion of the second image with the first sub-image and determining that the identified portion of the second image matches the first sub-image.

In another embodiment, the operations can include displaying, via the GUI, a prompt for the user to record the first image including the first sensor placed on the target in response determining that the orientation of the first image does not match the predetermined reference orientation.

In another embodiment, the operations can include receiving, via a radio frequency identification reader, a unique identifier of the target from a radio frequency identification tag corresponding to the target. The operations can also include receiving, from the memory, the predetermined reference orientation associated with the unique identifier. The operations can further include determining that the first image is not present in the memory. The operations can additionally include outputting, via the GUI, a prompt to record the first image in response to determining that the first image is not present in the memory.

In another embodiment, the operations can include identifying, using wavelet analysis, the first sensor in the first image.

In an embodiment, a method for consistently mounting a removable sensor to one or more machines is provided. The method can include recording, using a camera, an image that includes a sensor placed on a target, the sensor including a first plane marked with a first color, wherein the first plane is perpendicular to a first axis of the sensor and represents a positive direction of the first axis. The method can also include determining, using an accelerometer, an orientation of the image concurrently with the recording of the image. The method can further include identifying the sensor within the image. The method can additionally include determining, using the first color of the sensor identified within the image, an orientation of the sensor within the image relative to the orientation of the image, wherein the orientation of the sensor includes the positive direction of the first axis. The method can also include comparing the orientation of the sensor within the image to a predetermined reference orientation. The method can further include determining that the orientation of the sensor within the image matches the predetermined reference orientation. The method can additionally include recording, in response to determining that the orientation of the sensor within the image matches the predetermined reference orientation and using the sensor, a measurement of the target. The method can also include outputting, via a graphical user interface (GUI), a confirmation that the measurement was recorded.

In another embodiment, the method can include marking the first plane of the sensor with the first color.

In another embodiment, the sensor can include a rectangularly-packed triaxial accelerometer sensor or a cylindrically-packaged triaxial accelerometer sensor.

In another embodiment, the first color can include red, green, or blue.

In another embodiment, the identifying the sensor in the image can further include using wavelet analysis.

In another embodiment, the first color can be referenced against a known configuration of the sensor defining a correspondence between the first color and the positive direction of the first axis.

In another embodiment, the predetermined reference orientation can be associated with a target radio frequency identification. The method can also include capturing, by a radio frequency identification reader, the target radio frequency identification. The method can further include receiving, in response to capturing the target radio frequency identification and from a memory, the predetermined reference orientation associated with the target radio frequency identification.

In an embodiment, a system for consistently mounting a removable sensor to one or more machines is provided and can include at least one data processor and a memory. The memory can store instructions which, when executed by the at least one data processor, can perform operations including recording, using a camera, an image that includes a sensor placed on a target, the sensor including a first plane marked with a first color, wherein the first plane is perpendicular to a first axis of the sensor and represents a positive direction of the first axis. The operations can also include determining, using an accelerometer, an orientation of the image concurrently with the recording of the image. The operations can further include identifying the sensor within the image. The operations can additionally include determining, using the first color of the sensor identified within the image, an orientation of the sensor within the image relative to the orientation of the image, wherein the orientation of the sensor includes the positive direction of the first axis. The operations can also include comparing the orientation of the sensor within the image to a predetermined reference orientation. The operations can further include determining that the orientation of the sensor within the image matches the predetermined reference orientation. The operations can additionally include recording, in response to determining that the orientation of the sensor within the image matches the predetermined reference orientation and using the sensor, a measurement of the target. The operations can also include outputting, via a graphical user interface (GUI), a confirmation that the measurement was recorded.

In another embodiment, the operations can include marking the first plane of the sensor with the first color.

In another embodiment, the sensor can include a rectangularly-packed triaxial accelerometer sensor or a cylindrically-packaged triaxial accelerometer sensor.

In another embodiment, the first color can include red, green, or blue.

In another embodiment, the identifying the sensor in the image can further include using wavelet analysis.

In another embodiment, the first color can be referenced against a known configuration of the sensor defining a correspondence between the first color and the positive direction of the first axis.

In another embodiment, the predetermined reference orientation can be associated with a target radio frequency identification. The operations can also include capturing, by a radio frequency identification reader, the target radio frequency identification. The operations can further include receiving, in response to capturing the target radio frequency identification and from a memory, the predetermined reference orientation associated with the target radio frequency identification.

In an embodiment, a non-transitory computer program product for consistently mounting a removable sensor to one or more machines is provided and can store instructions. The instructions, when executed by at least one data processor of at least one computing system, can implement operations including recording, using a camera, an image that includes a sensor placed on a target, the sensor including a first plane marked with a first color, wherein the first plane is perpendicular to a first axis of the sensor and represents a positive direction of the first axis. The operations can also include determining, using an accelerometer, an orientation of the image concurrently with the recording of the image. The operations can further include identifying the sensor within the image. The operations can additionally include determining, using the first color of the sensor identified within the image, an orientation of the sensor within the image relative to the orientation of the image, wherein the orientation of the sensor includes the positive direction of the first axis. The operations can also include comparing the orientation of the sensor within the image to a predetermined reference orientation. The operations can further include determining that the orientation of the sensor within the image matches the predetermined reference orientation. The operations can additionally include recording, in response to determining that the orientation of the sensor within the image matches the predetermined reference orientation and using the sensor, a measurement of the target. The operations can also include outputting, via a graphical user interface (GUI), a confirmation that the measurement was recorded.

In another embodiment, the operations can include marking the first plane of the sensor with the first color.

In another embodiment, the sensor can include a rectangularly-packed triaxial accelerometer sensor or a cylindrically-packaged triaxial accelerometer sensor.

In another embodiment, the first color can include red, green, or blue.

In another embodiment, the identifying the sensor in the image can further include using wavelet analysis.

In another embodiment, the first color can be referenced against a known configuration of the sensor defining a correspondence between the first color and the positive direction of the first axis.

In another embodiment, the predetermined reference orientation can be associated with a target radio frequency identification. The operations can also include capturing, by a radio frequency identification reader, the target radio frequency identification. The operations can further include receiving, in response to capturing the target radio frequency identification and from a memory, the predetermined reference orientation associated with the target radio frequency identification.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Embodiments of systems and corresponding methods for consistently mounting a sensor to a machine for monitoring are discussed herein. Embodiments of the sensors are discussed below in the context of vibration monitoring. However, embodiments of the disclosure can be employed with any type of portable sensor to perform any type of monitoring without limit.

Figure 1:
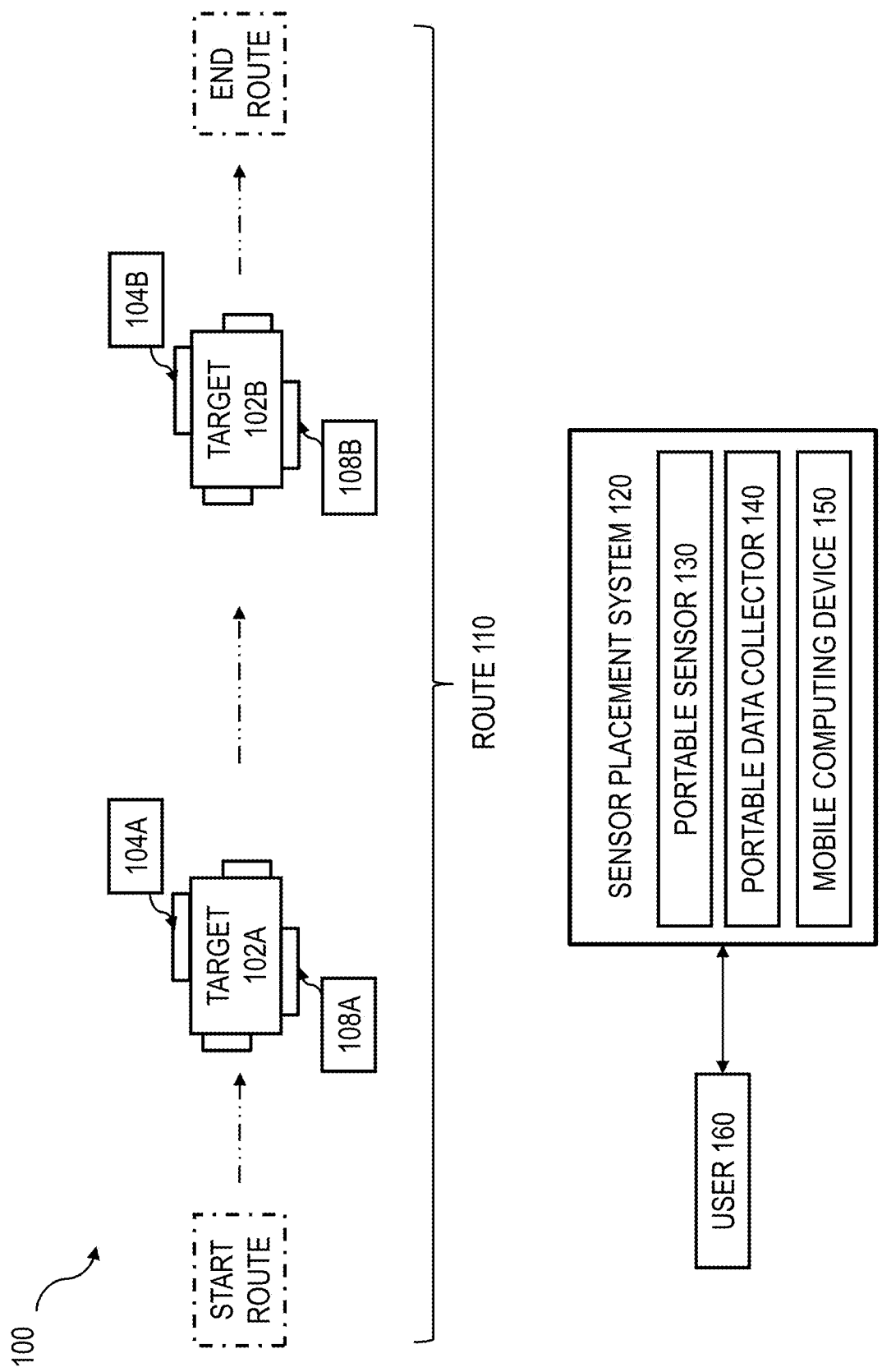
FIG. 1 is a schematic diagram illustrating one exemplary embodiment of an operating environment including machines monitored using portable sensors and a sensor placement system configured for placement of sensors on the monitored machines.

FIG. 1 is a schematic diagram illustrating one exemplary embodiment of an operating environment 100 including one or more target machines 102 (e.g., target 102A, target 102B, etc.) that can be monitored to evaluate machine performance and/or prevent machine failure. As discussed in greater detail below, monitoring can include temporarily mounting a portable sensor 130 at one or more sensing position of each of the targets 102 and recording measurements acquired by the sensor 130.

It can be desirable to consistently position (e.g., mount) the portable sensor 130 at one or more sensing positions (e.g., 104A, 104B, 108A, 108B) of target machine 102. Positioning can include the location at which the portable sensor 130 is placed on the target 102. If the portable sensor 130 is not positioned in the correct location on a target 102, the portable sensor 130 may fail to acquire measurements from the desired portion(s) of the target 102.

Positioning can also include the orientation of the portable sensor 130 with respect to the target 102 at the sensing position. As an example, embodiments of the portable sensor 130 can include one or more sensor or measurement axes. For a portable sensor 130 in the form of a vibration sensor, the sensor axes can be the directions in which the portable sensor 130 measures motion. If one or more of the sensor axes are not aligned correctly with respect to the target 102 when positioned at the sensing position, error can be introduced into measurements acquired by portable sensor 130. By placing the portable sensor 130 consistently at the same sensing position and sensing orientation with respect to each target 102 along the route 110, measurement accuracy can be increased.

A sensor placement system 120 can be employed by the operator (e.g., user 160) to facilitate consistent placement of the portable sensor 130 at the sensing location(s) of each target 102.

Figure 2:
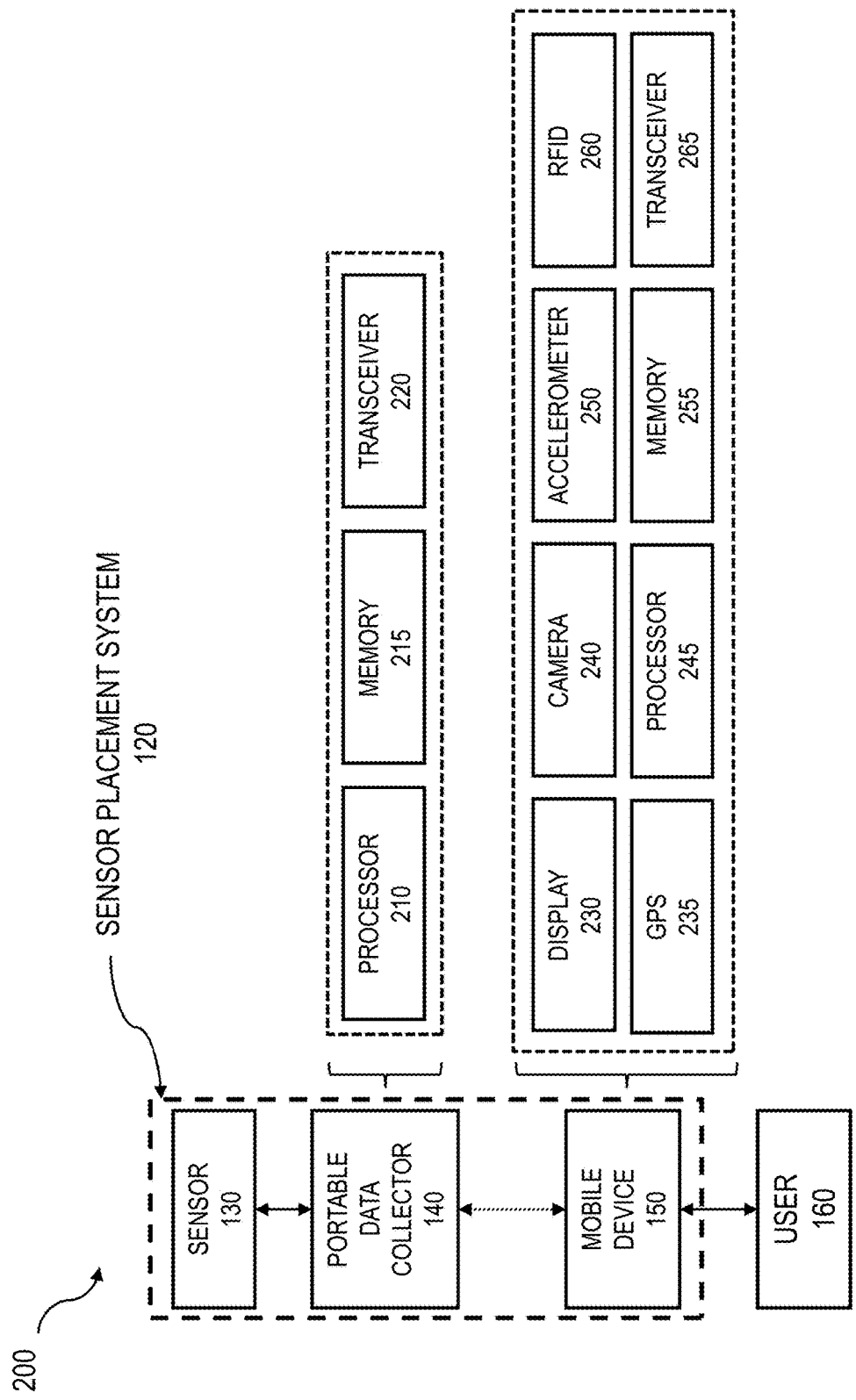
FIG. 2 is a schematic diagram illustrating one exemplary embodiment of the sensor placement system of FIG. 1 including a portable data collector and a mobile device.

FIG. 2 is a schematic diagram illustrating the sensor placement system 120 in greater detail. The sensor placement system 120 can be configured to facilitate the consistent placement of the portable sensor 130 along the route 110 including one or more target 102. As shown, the sensor placement system 120 includes the sensor 130, a portable data collector 140, and a mobile computing device 150. By using sensor placement system 120 including portable data collector 130 and mobile computing device 150 can facilitate consistent mounting of the portable sensor 130 on one or more targets 102 along route 110, with attendant improvements in accuracy and reliability of measurements acquired by the portable sensor 130.

The portable sensor 130 can include, in some embodiments, single axis and multi-axis (e.g., triaxial) sensors. Examples of such sensors can include proximity sensors, acoustic sensors, accelerometers, velocity sensors, etc. For instance, when the portable sensor 130 is a vibration sensor mounted to the target 102, the portable sensor 130 can be configured to output signals representing vibration measurements, such as overall vibration level (e.g., peak-to-peak amplitude, root-mean-squared (RMS) amplitude, impact crest fall, amplitude demodulation, etc.) As further discussed below with reference to FIG. 5, embodiments of the portable sensor 130 can include a rectangularly packaged triaxial sensor. As additionally discussed below with reference to FIG. 6, other embodiments of the portable sensor 130 can include a cylindrically packaged triaxial accelerometer.

The portable data collector 140 can include a processor 210, a memory 215, and a transceiver 220. In some embodiments, the portable data collector 140 can include Bently Nevada™ SCOUT 100 and 200 and vb series portable vibration analyzer instruments (e.g., 100, 140, 220 and 240 series data collectors). In some embodiments, the portable data collector 140 can be intrinsically safe. Intrinsic safety can include a protection technique for safe operation of electrical equipment in hazardous areas. In some embodiments, the electrical and thermal energy of the equipment can be limited to prevent the equipment from becoming a source of ignition.

The mobile device 150 can include a display 230, a global positioning system (GPS) 235, a camera 240, a processor 245, an accelerometer 250, a memory 255, a radio-frequency identification (RFID) 260, and a transceiver 265. In some embodiments, the mobile device 150 can include an industrial smart phone handheld device. In some embodiments, mobile device 150 can be configured to collect vibration data, take pictures, send and receive text messages, send and receive emails, make phone calls, and run other mobile applications.

The portable sensor 130 can be communicatively coupled to the portable data collector 140. The portable data collector 140 can be communicatively coupled to the mobile computing device 150. For example, communicatively coupling two elements can include wired and/or wireless communication. Examples of wired communication can include Ethernet. Examples of wireless communication can include communication via a wireless protocol such as a Bluetooth protocol, cellular protocol, IEEE 802.11b/g/n/ac direct sequence (Wi-Fi) protocol, near field communication (NFC) protocol, a radio frequency identification (RFID) protocol, and/or the like. The mobile device 150 can be operated by a user 160, such as a technician, and can facilitate the consistent placement of the sensor 130 on target 102. By using the mobile computing device 150 and the portable data collector 140 to consistently mount the portable sensor 130 on a target 102 along the route 110, sensor measurement accuracy can be increased.

Figure 3:
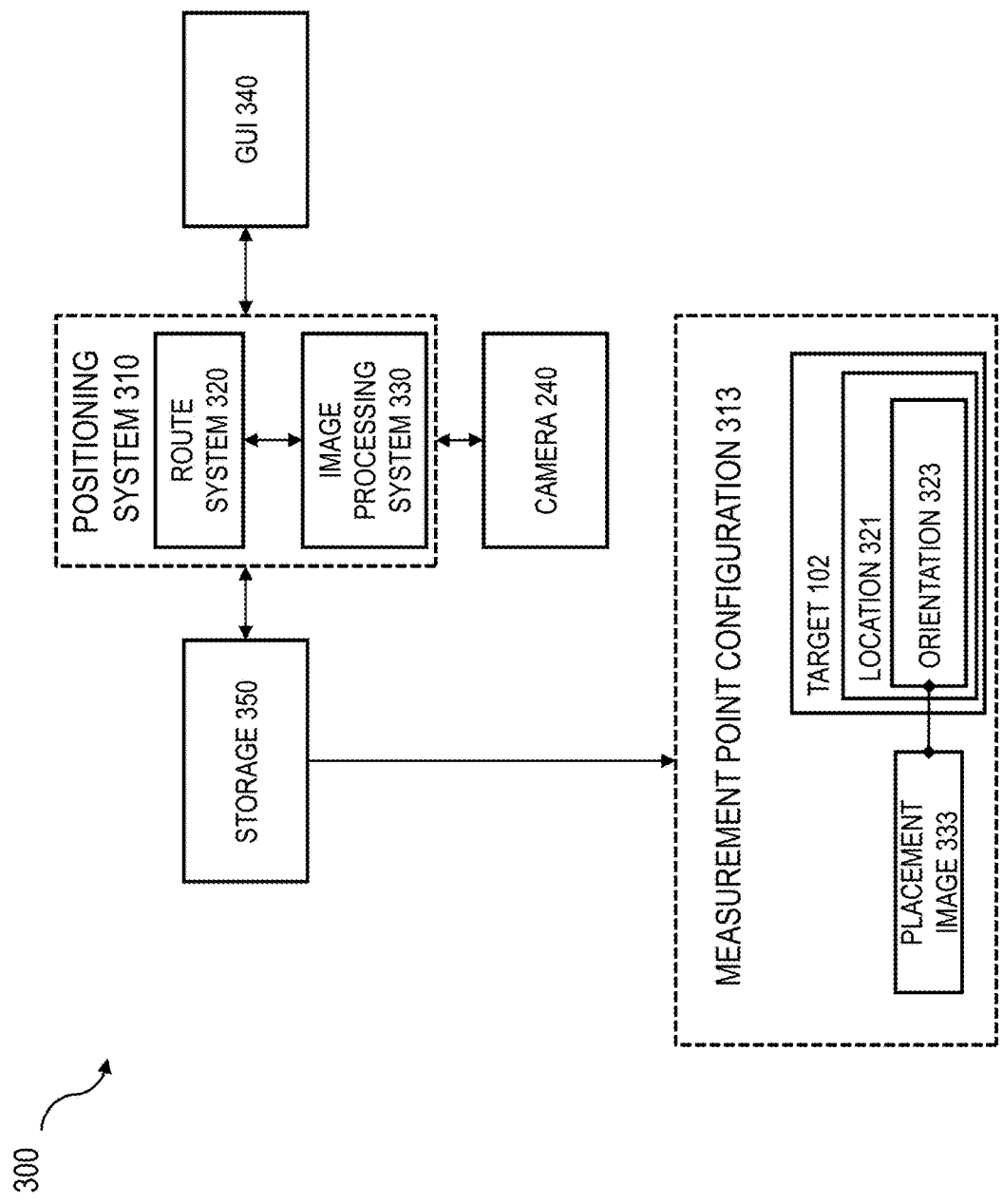
FIG. 3 is a schematic diagram illustrating operation of the mobile device 150.

FIG. 3 is a diagram illustrating a system 300 employing the mobile computing device 150. In some embodiments, the system 300 can be configured to guide a user 160, such as a technician, through the route 110 of targets 102. The system 300 can include a positioning system 310, a graphical user interface (GUI) 340, and one or more storage devices 350. The system 300 can facilitate reproducible mounting of the portable sensor 130 in sensing orientations 323 at sensing locations 321 on target 102. By utilizing the system 300, the accuracy of collected sensor measurements can be increased, image processing can be improved, and better asset monitoring can be realized.

The positioning system 310 can include a route subsystem 320 and an image processing subsystem 330. The route system 320 can be communicatively coupled to the image processing system 330, the GUI 340, the camera 240, and the one or more storage devices 350. The route system 320 can be configured to transmit and receive data characterizing the route 110 and data characterizing interaction of the user 160 with the GUI 340, as described below. For example, the route system 320 can transmit measurement point configuration 313.

The measurement point configuration 313 can include, for a given location 321 on a target 102 along route 110, a desired orientation 323 for mounting the portable sensor 130. The measurement point configuration 313 can also include a placement image 333. The placement image 333 can include a picture of the portable sensor 130 mounted on target 102 at a given location 321 and in a respective orientation 323. The measurement point configuration 313, including the placement image 333 and corresponding target 102, location 321, and orientation 323 information can be stored in storage 350.

The image processing system 330 can be configured to identify the portable sensor 130 in an image recorded by the camera 240 at a first resolution (e.g., 3.3 Megapixels, 5 Megapixels, 6 Megapixels, 12.5 Megapixels, 32 Megapixels, and/or the like). In one embodiment, the image processing system 330 can be configured to identify the portable sensor 130 in response to input received from the user 160 via the GUI 340 indicating a boundary surrounding the sensor 130 within the recorded image. As an example, the GUI 340 can be a touch-sensitive display and the boundary can be input by the user 160 via the touch-sensitive display (e.g., by drawing the boundary). In an another embodiment, the boundary can be automatically determined (e.g., based upon a machine analysis of the recorded image).

In a further embodiment, the image processing system 330 can be configured to make a provisional determination whether the sensor 130 is present within the recorded image and, if so, whether the orientation of the sensor 130 is correct using object detection techniques. The provisional determination can be subsequently accepted by the user 160.

In some embodiments, the object detection technique includes wavelet analysis. In general, a wavelet analysis can include a discrete wavelet transform that decomposes the recorded image into multiple levels, with each level including details from a respective frequency in the frequency domain that can correspond to edges in the recorded image. Thus, rather than employing the raw pixels of the recorded image, the wavelet analysis can determine edges from the recorded image and construct representative objects for the items in the recorded image based upon these edges (e.g., contiguous edges). Thus, if present within the recorded image, the wavelet analysis can determine a boundary (e.g., edges) of the sensor 130.

Once the representative objects have been identified in the recorded image, the shape of each of the representative objects can be compared to the shape of the sensor 130 within a reference image of the portable sensor 130 using means-squared error analysis and feature detection error minimization (e.g., scale invariant feature transformation). In this manner, the image processing system 330 can provisionally detect the presence or absence of the sensor 130 within the recorded image.

In addition to the shape of the sensor 130, t the reference image can also illustrate a desired orientation desired for the portable sensor 130. Under circumstances where the portable sensor 130 is provisionally detected within the recorded image, the image processing system 330 can further make a provisional determination whether the orientation of the sensor 130 within the recorded image matches the desired orientation. As an example, the relative orientations of one or more reference features (e.g., a longitudinal axis) of the reference image can be compared to a corresponding feature of the recorded image.

Figure 4:
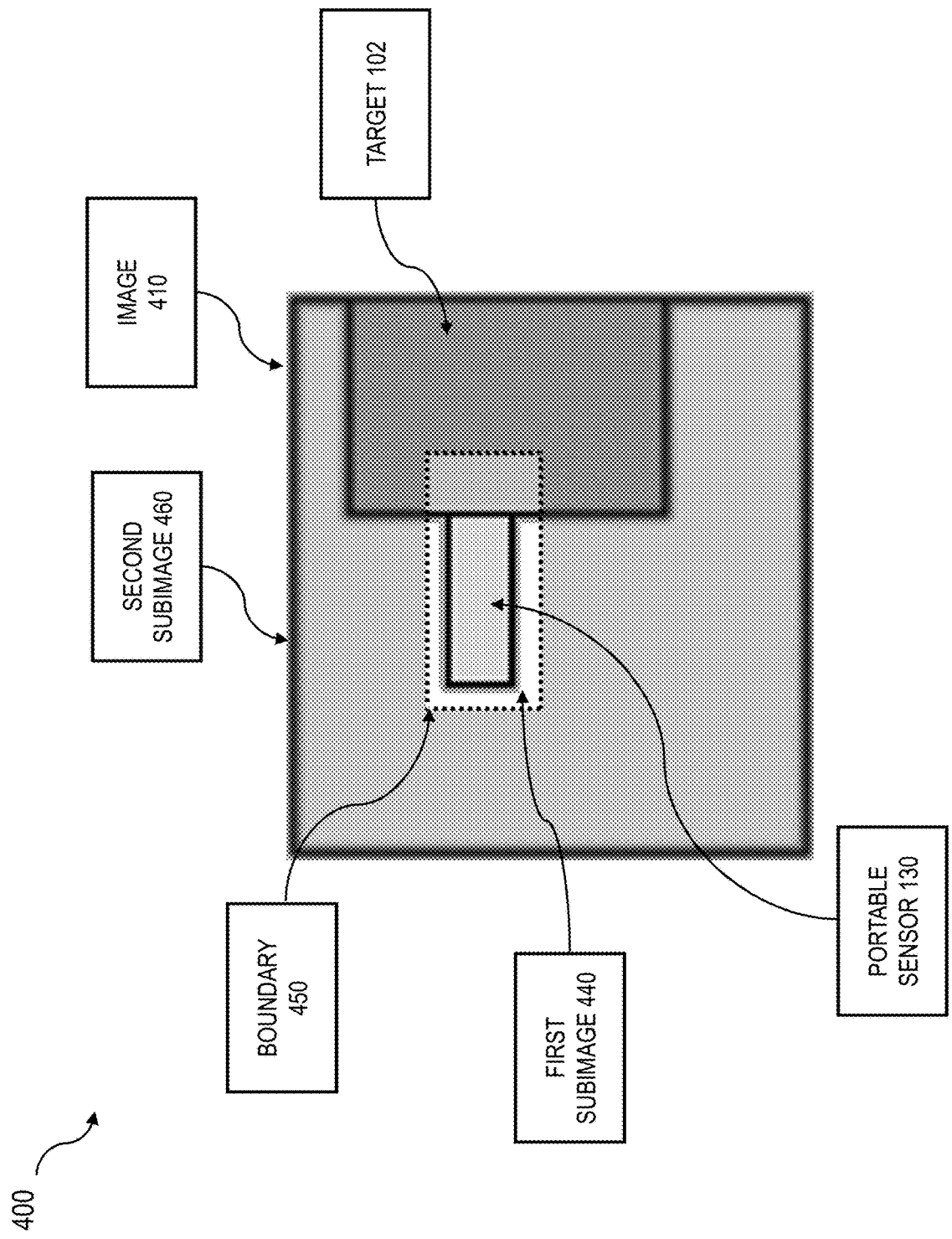
FIG. 4 is a diagram illustrating one exemplary embodiment of an image including a sensor on a target.

Subsequently, the user 160 can be presented with one or more prompts via the GUI. As an example, the user 160 can be presented with a prompt requesting confirmation that a provisional determination of the presence or absence of the sensor 130 within the recorded image is correct. Under circumstances where the user 160 confirms that the sensor 130 is present within the recorded image, the user 160 can be presented with a further prompt requesting confirmation of the provisional orientation of the sensor 130 matches that of the reference image. If so, the FIG. 4 is a diagram illustrating an one exemplary embodiment of an image 410 generated by the image processing system 330 from the recorded image in accordance with some embodiments of the current subject matter. As noted above, the recorded image can be captured by the camera 240 at a first resolution and it can include the portable sensor 130 coupled to the target 102. Image 410 can include a first subimage 440 and a second subimage 460. The first subimage 440 can include a portion of the recorded image at the first resolution surrounded by the boundary 450 discussed above (e.g., determined by the user 160 or automatically by the image processing system 330. Thus, the first subimage 440 can include the portable sensor 130 and contextual information illustrating the location on the target 102 and the orientation of the portable sensor 130 when mounted on the target 102.

The second subimage 460 can include at least a portion of the recorded image outside of the boundary 450 at a second resolution that is less than the first resolution. The second subimage 460 can be generated by compressing the image 410 using image compression techniques such as run-length encoding, area image compression, entropy encoding, chain codes, transform coding (e.g., using the discrete cosine transform, and/or the like), and/or the like.

Figure 5:
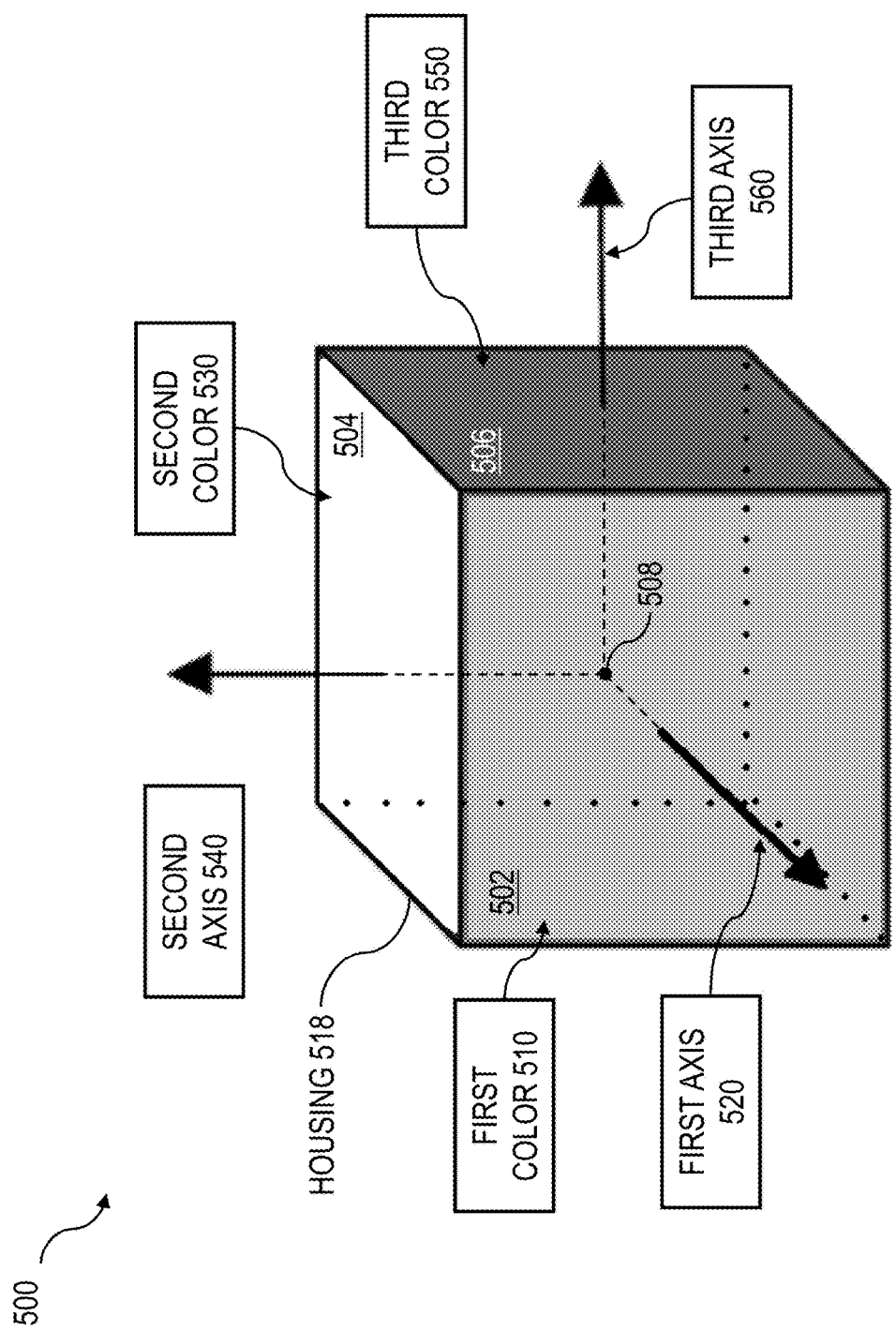
FIG. 5 is a diagram illustrating one exemplary embodiment of a marked rectangular triaxial accelerometer.

FIG. 5 is a diagram illustrating an exemplary embodiment of a rectangularly packed triaxial sensor 500. A triaxial sensor, such as the rectangularly packed triaxial sensor 500, can provide, for example, sensor measurements along three orthogonal axes. Sensor 500 can include a first axis 520, a second axis 540, and a third axis 560. The triaxial sensor 500 can include a housing 518 with an external surface that is configured to protect the internal components, such as internal electrical components, from damage during operation. Respective surfaces of the housing 518 can be marked with colors and/or patterns corresponding to respective measurement axes (e.g., normal surfaces). As shown, at least a portion of a first surface 502 normal to the first axis 520 can be marked with a first color 510, at least a portion of a second surface 504 normal to the second axis 540 is marked with a second color 530, and at least a portion of a third surface 506 can be marked with a third color 550. The marking can be provided by painting the surface, powder coating the surface, and/or the like.

In addition to designating respective axes 520, 540, and 560, markings on the housing 518 such as colors and/or patterns can also be employed to indicate positive and negative directions of the axes 520, 540, 560. As an example, positive directions can extend in the direction of the arrowheads of axes 520, 540, 560, while negative directions can extend in the opposite direction. As shown in FIG. 5, the positive direction of the first axis 520 extends through the first surface 502, the positive direction of the second axis 540 extends through the second surface 504, and the positive direction of the third axis 560 extends through the third surface 506. The marking of the positive direction can be respective colors while the marking in the negative direction can be a predetermined pattern. The marking can include any combination of colors and/or patterns without limit.

The triaxial sensor 500 can acquire measurements independently from the first axis 520, the second axis 540, and the third axis 560 relative to the target 102. The measurements collected from the triaxial sensor 500 can be sensitive to the orientation of the first axis 520, the second axis 540, and the third axis 560. As will be described below, the markings on the triaxial sensor 500 (e.g., first color 510, second color 530, third color 550, first pattern, second pattern, third pattern, and/or the like) can be used by image processing system 330 to determine sensing orientation 450 of sensor 500. For example, markings (e.g., first color 510, second color 530, third color 550, first pattern, second pattern, third pattern, and/or the like) can include a minimum threshold value and a maximum threshold value. For example, markings can include red, green, blue, and/or the like. The color red can be defined in a red green blue (RGB) color space as (255, 0, 0). Similarly, green can be defined as (0, 255, 0) and blue can be defined as (0, 0, 255). As such, the first color can include red, green, or blue. For example, first color 510 can include a minimum threshold value of (235, 0, 0) and a maximum threshold value (255, 0, 0). Alternative color spaces are also envisioned (e.g., CMYK, CIE, luma plus chroma, cylindrical transformations, etc.)

Regardless of the color space employed, when an identified pixel color value for a selected pixel is determined to be within the range of threshold values associated with the first color, the selected pixel can be determined to be within a region corresponding with the first color. As such, that region can be associated with a direction of first axis 520 and/or a respective axis of sensor 500 corresponding to a respective color. Similarly, second color 530, third color 550, and/or the like can be identified.

Figure 6:
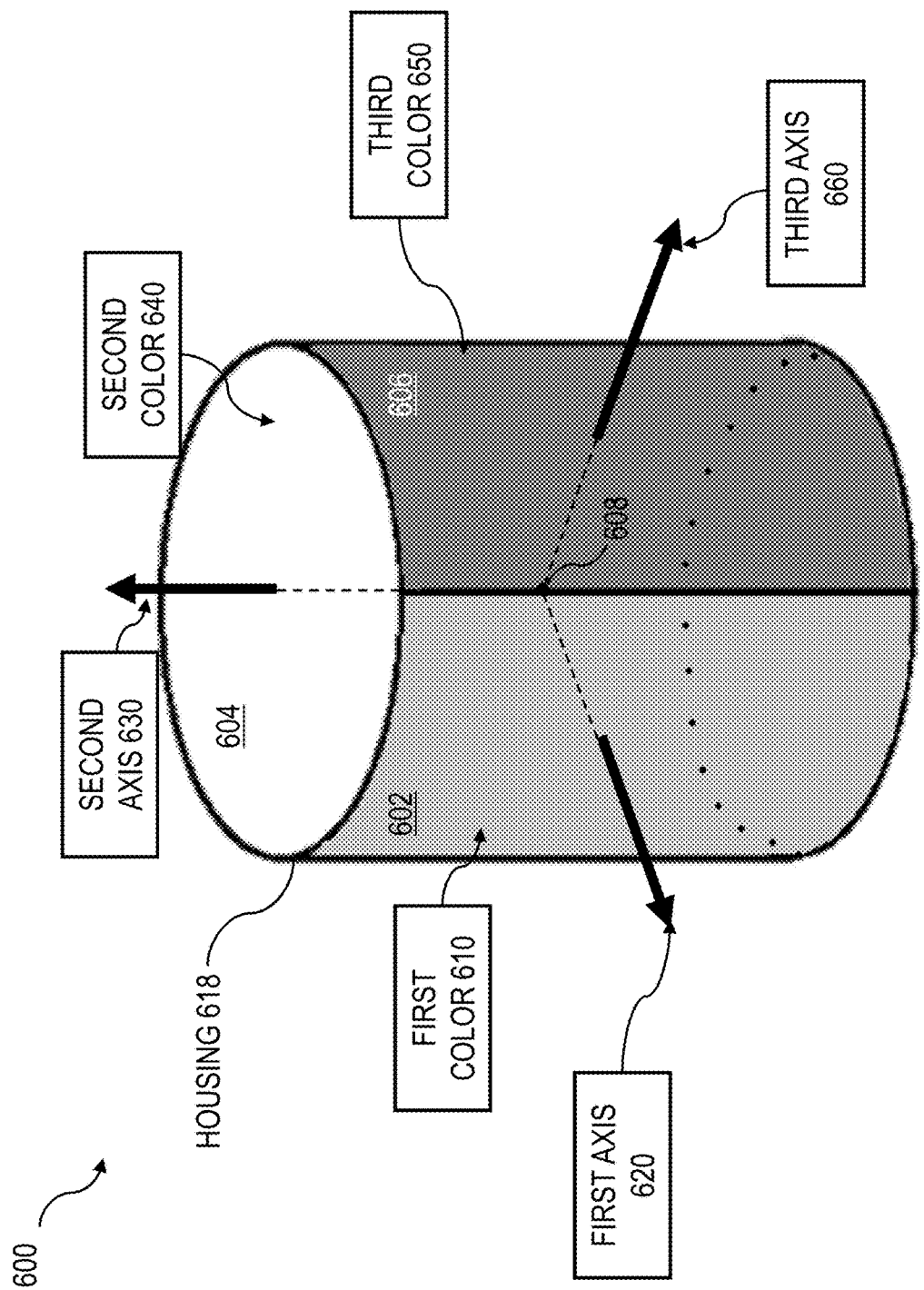
FIG. 6 is a diagram illustrating one exemplary embodiment of a marked cylindrical triaxial accelerometer.

FIG. 6 is a diagram illustrating an example embodiment of a cylindrically packed triaxial sensor 600. A triaxial sensor, such as cylindrically packed triaxial sensor 600, can provide, for example, sensor measurements along three orthogonal axes. Similar to the rectangularly packaged triaxial sensor 500, cylindrically packed triaxial sensor 600 can include first axis of orientation 620, second axis of orientation 640, and third axis of orientation 660. Sensor 600 can include a housing 618. The housing 618 can include an external surface and can facilitate protecting the internal components, such as electrical components, from damage. The external surface can include a first portion 602 of the external surface marked with first color 610, a second portion 604 of the external surface marked with second color 630, and a third portion 606 of the external surface marked with third color 650.

A positive direction of the first axis 620 (e.g., a first direction) can extend through the center of the triaxial sensor 600 and the portion of the external surface marked with the first color 610. In some embodiments, a negative direction of the first axis 620 (e.g., a second direction) can extend through the center 608 of sensor 600 and the portion of the external surface marked with a first pattern. In some embodiments, a positive direction of the second axis 640 (e.g., a third direction) can extend through the center of the triaxial sensor 600 and the portion of the external surface marked with the second color 630. In some embodiments, a negative direction of the second axis 640 (e.g., a fourth direction) can extend through the center of the triaxial sensor 600 and a portion of the external surface marked with the second color 630. In some embodiments, a positive direction of the third axis 660 (e.g., a fifth direction) can extend through the center of the triaxial sensor 600 and a portion of the external surface marked with the third color 650. In some embodiments, a negative direction of the third axis 660 (e.g., a sixth direction) can extend through the center of sensor the triaxial 600 and through a portion of the external surface marked with the third color 650.

Measurements from the triaxial sensor 600 can be collected independently from the first axis 620, the second axis 640, and the third axis 660. The measurements collected from the triaxial sensor 600 can be sensitive to orientation of the first axis 620, the second axis 640, and the third axis 660. As discussed above, the markings on the triaxial sensor 600 (e.g., first color 610, second color 630, third color 650, first pattern, second pattern, third pattern, and/or the like) can be used by image processing system 330 to determine sensing orientation 450 of sensor 600. For example, markings (e.g., first color 610, second color 630, third color 650, first pattern, second pattern, third pattern, and/or the like) can include a minimum threshold value and a maximum threshold value represented in a selected color space. When an identified pixel color value for a selected pixel is determined to be within the range of threshold values associated with the first color, the selected pixel can be determined to be within a region corresponding with the first color. As such, that region can be associated with a direction of a respective axis of sensor 600.

Figure 7:
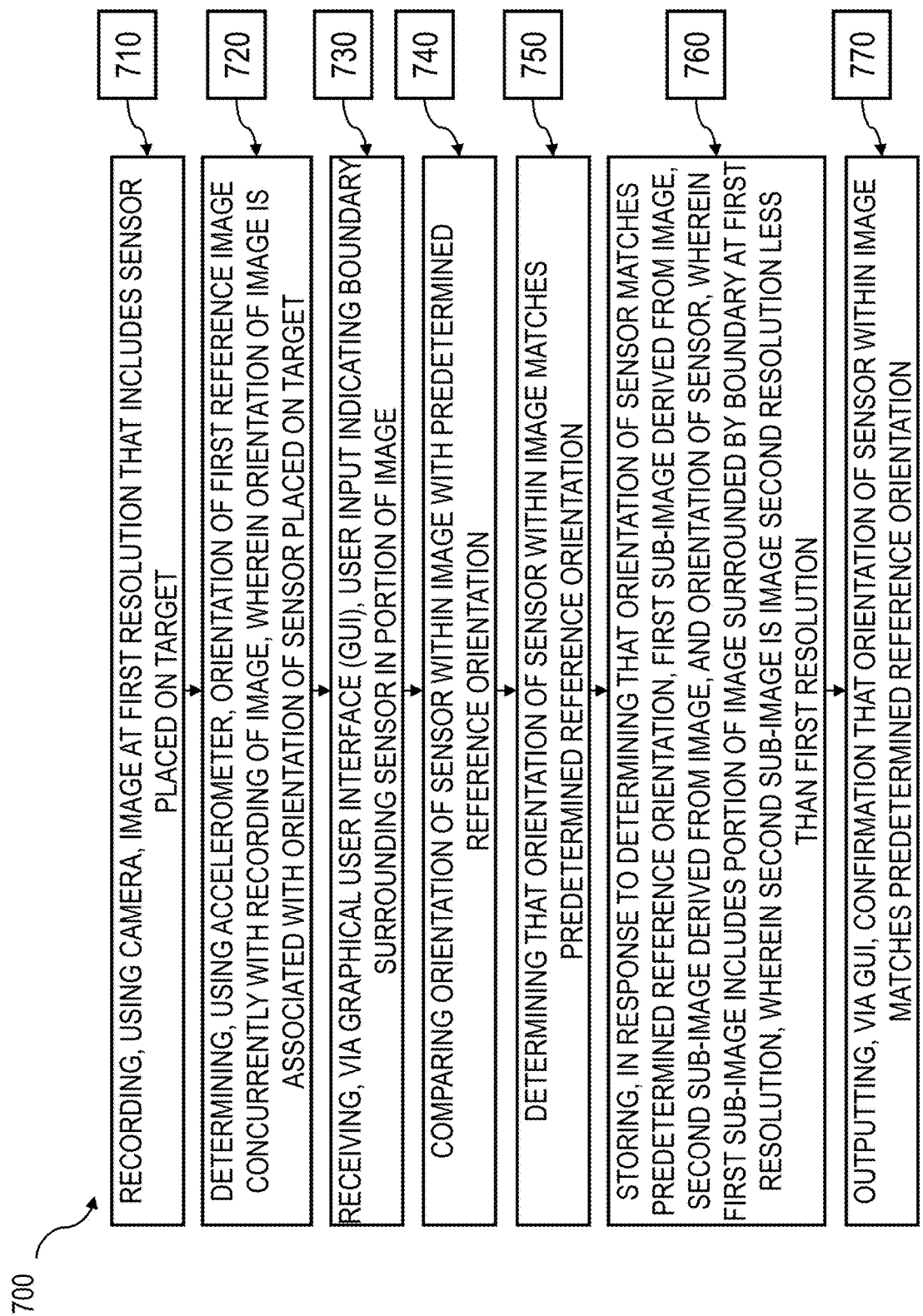
FIG. 7 is a flow diagram illustrating one exemplary embodiment of a method for determining an orientation of a sensor.

FIG. 7 is a flow diagram 700 illustrating an exemplary embodiment of a method 700 for determining an orientation of a sensor placed on a target. By utilizing the method 700, accuracy and reproducibility of the portable sensor 130 placement on each target 102 along the route 110 of machines monitored by the asset monitoring system can be achieved.

At 710 an image can be recorded at a first resolution using a camera. The image can include a sensor placed on a target. The first resolution can include an image resolution with a sufficient number of pixels to detail the placement of the sensor on the image. At 720, an orientation of the image can be determined using an accelerometer. The orientation of the image can be determined concurrently with the recording of the image, such as, by recording the orientation of the mobile device when the image was recorded and associating the orientation of the device with the orientation of the image. For example, the image can be recorded while the device is in a landscape orientation (e.g., a horizontal orientation of the mobile device such that mobile device can be wider than it is tall), a portrait orientation (e.g., a vertical orientation of the mobile device such that the mobile device can be taller than it is wide), and/or the like. If the mobile device is in a landscape orientation while the image is being recorded, than a landscape orientation can be associated with the image. Similarly, any orientation of the mobile device determined by the accelerometer can be associated with the image as the orientation of the image.

With the orientation of the image determined, relative direction in the image can be ascertained. For example, directions such as up or right can be established and associated with the orientation of the sensor. As such, the orientation of the image can be associated with the orientation of the sensor placed on the target. As another example, if the mobile device captured the image while in a portrait orientation and the image is displayed within a display space of the GUI in a portrait orientation, the up direction of the image can substantially correspond with the up direction of the mobile device and the right direction can substantially correspond with the right direction of mobile device. If, however, the mobile device captured the image while in a portrait orientation and the image is displayed in a landscape orientation (e.g., orientation of the mobile device when rotated 90 degrees counter-clockwise relative to orientation of mobile device when the image was recorded captured), then the up direction of the image can substantially correspond with the left direction of the mobile device and the right direction of the image can substantially correspond with the up direction of mobile device.

At 730, a user input can be received via a graphical user interface. The user input can indicate a boundary surrounding the sensor in a portion of the image. For example, the user input can include pressing the display of the mobile device at a portion of the image substantially proximal to the location of the sensor within the image. In response to the user indicating the location of the sensor, a boundary can be displayed in the GUI overlaid upon the image and in the location of the image substantially corresponding to the portion of the image indicated by the user. The boundary surrounding the sensor can surround a portion of the target adjacent to the sensor where the sensor is mounted to the target. In some embodiments, the sensor can be identified in the portion of the image surrounded by the boundary. As described above, object detection techniques, such as wavelet analysis, can be used to detect the sensor within the image. For example, the sensor can be detected by detecting features from the image of the sensor (e.g., silver, cylindrical, black cabling, and/or the like) matching features to a best candidate match (e.g., with minimum distance, such as Euclidean distance, from a given feature descriptor vector in an n-dimensional feature vector space and/or the like), verifying identified candidates using an error estimation (e.g., linear least squares and/or the like), and removing outliers.

At 740, the orientation of the sensor within the image can be compared with a predetermined reference orientation. The predetermined reference orientation can define (e.g., determine) the desired orientation of the sensor when placed on the target. For example, the predetermined reference orientation can specify that the sensor should be placed in a vertical orientation when mounted to the target. At 750, the orientation of the sensor within the image can be determined to match the predetermined reference orientation. For example, if the predetermined reference orientation indicates that the sensor should be mounted on the target in a vertical orientation and the orientation of the sensor within the image is a vertical orientation, then the orientation of the sensor within the image can be determined to match the predetermined reference orientation.

In some embodiments, the predetermined reference orientation can be associated with a unique identifier of the target. As an example, the unique identifier can be stored by a radiofrequency identification device (RFID) associated with the target. An RFID tag associated with the target can be an RFID tag that is positioned on or adjacent to the target.

When the RFID device is queried by an RFID reader (e.g., an RFID reader incorporated within the mobile device 150), the unique identifier can be returned. With the unique identifier received by the mobile device 150, the predetermined reference orientation associated with the target can be retrieved. As an example, the predetermined reference orientation associated with the target can be retrieved by the mobile device 150 from a memory maintained by the mobile device 150 and/or a memory accessible to the mobile device 150 via a communication network.

While retrieval of the predetermined reference orientation is discussed above with regards to an RFID tag, other mechanisms for retrieval can be employed without limit. As an example, a barcode can be associated with the target (e.g., positioned on or adjacent to the target) and a barcode reader (e.g., incorporated within the mobile device) can be employed to read the barcode. The barcode can include the unique identifier. Once the unique identifier is received by the mobile device, the predetermined reference orientation associated with the target can be retrieved by the mobile device 150 from a memory maintained by the mobile device 150 and/or a memory accessible to the mobile device 150 via a communication network.

At 760, a first sub-image derived from the image, a second sub-image derived from the image, and an orientation of the sensor can be stored in response to determining that the orientation of the sensor matches the predetermined reference orientation. The first sub-image can include the portion of the image surrounded by the boundary. The first sub-image can be stored at the first resolution. The second sub-image can include the image at a second resolution less than the first resolution. For example, the second sub-image can be generated by compressing the image from the first resolution to the second resolution. At 770, a confirmation that the orientation of the sensor within the image matches the predetermined reference orientation can be output via the GUI. In some embodiments, a measurement of the target can be recorded by the sensor in response to the orientation of the sensor within the image matching the predetermined reference orientation and the measurement can be stored in memory. A confirmation that the measurement was recorded can be output via the GUI.

In some embodiments, the first sub-image, the second-sub image, and the orientation of the sensor within the image can be stored in memory to be used in the future as the predetermined reference orientation. During a future execution of the asset monitoring route, a similar operation can be performed to ensure that the sensor is mounted consistently with past placements. For example, a second image can be recorded using the camera. The second image can include a second sensor placed on the target. The second image can be compared to the first sub-image and the second sub-image. The second image can be determined to match the first sub-image and the second sub-image. In response to determining that the second image matches the first sub-image and the second sub-image (e.g., the orientation of the sensor within the second image matches the predetermined reference orientation now defined by the first sub-image, second sub-image, and orientation of the sensor received from memory), the orientation of the second sensor can be determined to match the orientation of the sensor.

In some cases, a portion of the second image including the second sensor can be identified and the identified portion of the second image can be compared with the first sub-image. The orientation of the second sensor can be determined to match the orientation of the sensor when the identified portion of the second image matches the first sub-image. A confirmation that the orientation of that the second sensor matches the orientation of the sensor. In some embodiments, a measurement of the target can be recorded by the second sensor in response to the orientation of the second sensor matching the orientation of the sensor and a confirmation that the measurement was recorded can be output via the GUI. In some cases, the user can be prompted to record the image of the sensor placed on the target. For example, in response to the orientation of the image not matching the orientation of the predetermined reference orientation, the user can be prompted to adjust the placement of the sensor on the target and record a new image.

Figure 8:
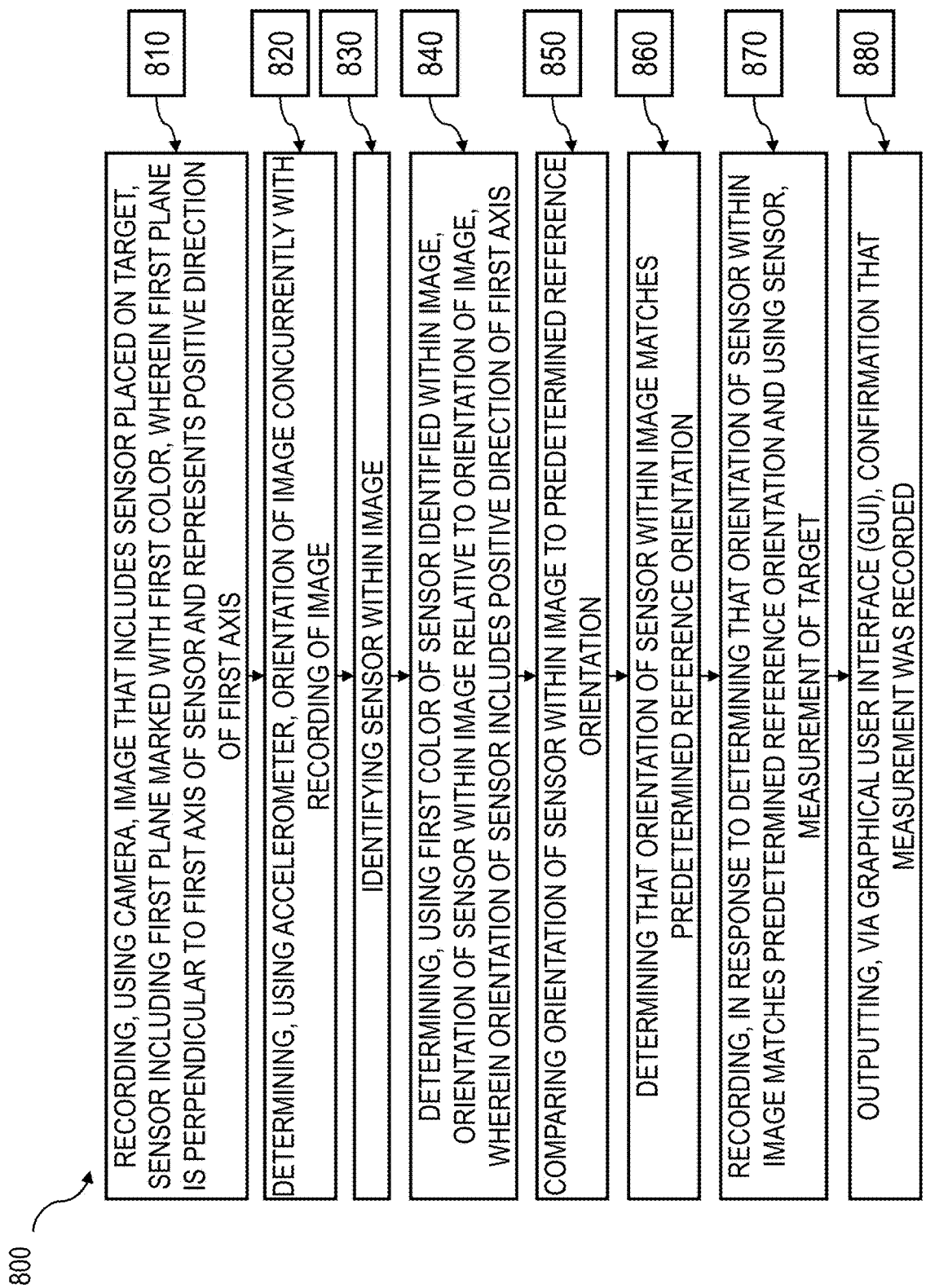
FIG. 8 is a flow diagram illustrating one exemplary embodiment of a method for determining an orientation of a sensor.

FIG. 8 is a flow diagram 800 illustrating an exemplary embodiment of a method for determining an orientation of a sensor placed on a target. By utilizing the method illustrated in 800, less computation resources can be the orientation of sensor 130 placed on target 102 can be determined reproducibility of sensor 130 placement on each target 102 along route 110 of machines monitored by the asset monitoring system can be achieved. By reproducing sensor 130 placement on each target 102, the accuracy of sensor 130 measurements collected from each target 102 can be improved. And improving the accuracy of the collected sensor 130 measurements can result in an improved asset monitoring system.

At 810, an image can be recorded using a camera. The image can include a sensor placed on a target. The sensor can include a first plane marked with a first color. The first plane can be perpendicular to a first axis of the sensor and can represent a positive direction of the first axis. The first color can include red, green, blue, combinations thereof, and/or the like. It can be noted that other color spaces (e.g., cyan magenta yellow key (CMYK), ADOBE RGB, luminance/chroma (Y'UV), hue saturation lightness (HSL), hue saturation value (HSV), and/or the like) can be utilized. In some embodiments, In some embodiments, the first plane can correspond to a plane in three-dimensional Euclidean space. In some embodiments, the first plane can correspond to a curved surface in three-dimensional Euclidean space (e.g., the surface of a cylinder). And other surface topologies are contemplated.

At 820, an orientation of the image can be determined using an accelerometer. The orientation of the image can be determined concurrently with the recording of the image, such as described above with reference to step 720 of FIG. 7. At 830, the sensor can be identified within the image. As discussed above, object detection techniques, such as wavelet analysis, can be used to detect the sensor within the image.

At 840, an orientation of the sensor within the image relative to the orientation of the image can be determined using the first color of the sensor identified within the image. The orientation of the sensor can include the positive direction of the first axis. As described above with reference to FIG. 5 and FIG. 6, the first color can include a minimum threshold value and a maximum threshold value. The first color can be identified within the image by, for example, identifying pixels within the image including the first color (e.g., pixel values between the minimum threshold value and the maximum threshold value) and can be used to determine the direction of the first axis within the image. Consequently, the orientation of the sensor within the image (e.g., oriented based on the direction of the first axis) can be determined relative to the orientation of the image.

At 850, the orientation of the sensor within the image can be compared to the predetermined reference orientation, such as described above with reference to step 740 of FIG. 7. At 860, the orientation of the sensor within the image can be determined to match the predetermined reference orientation, such as described above with reference to step 750 of FIG. 7. At 870, a measurement of the target can be recorded using the sensor. The measurement can be recorded in response to determining that the orientation of the sensor within the image matches the predetermined reference orientation. At 880, a confirmation that the measurement was recorded can be output via a GUI.

In certain embodiments, prior to recording the image, a check can be performed to determine whether the image is present in a memory. Under circumstances where the image is not present in the memory, the user can be presented with a prompt (e.g., via the GUI) to record the image.

Exemplary technical effects of the methods, systems, and devices described herein include, by way of non-limiting example, sensor placement systems assembled from mobile devices, portable data collectors, and sensors to consistently mount sensors on monitored machines. Sensor placement on machines can be documented for future use, and the documentation can be utilized to consistently mount the sensors. Avoiding inconsistency in measurements as a result of varying sensor placement can provide for more accurate sensor measurements recorded while monitoring the condition of the machines. More accurate sensor measurements can provide for improved asset monitoring. In some cases, this can include improved machine performance and/or reduction of unsatisfactory machine performance. In addition, storage space utilized to document sensor placement can be reduced. Reducing storage space, including reduced placement image file size, can provide for a faster and more efficient asset monitoring system.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an embodiment of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

What is claimed is:

1. A method comprising:
   recording, using a camera, a first image at a first resolution that includes a first sensor placed on a target;
   determining, using an accelerometer, an orientation of the first image concurrently with the recording of the first image, wherein the orientation of the first image is associated with an orientation of the first sensor placed on the target within the first image;
   receiving, via a graphical user interface (GUI), a user input indicating a boundary surrounding the first sensor in a portion of the first image;
   comparing the orientation of the first sensor within the first image with a predetermined reference orientation;
   determining whether the orientation of the first sensor within the first image matches the predetermined reference orientation;
   storing, in a memory in response to determining that the orientation of the first sensor matches the predetermined reference orientation, a first sub-image derived from the first image, a second sub-image derived from the first image, and the orientation of the first sensor, wherein the first sub-image includes the portion of the first image surrounded by the boundary at the first resolution, wherein the second sub-image is the first image at a second resolution less than the first resolution; and
   outputting, via the GUI, a confirmation that the orientation of the first sensor within the first image matches the predetermined reference orientation.

2. The method of claim 1, further comprising:
   receiving, from the memory, the first sub-image, the second sub-image, and the orientation of the first sensor;
   recording, using the camera, a second image, the second image including a second sensor placed on the target;
   comparing the second image to the first sub-image and the second sub-image;
   determining whether the second image matches the first sub-image and the second sub-image;
   determining, in response to determining that the second image matches the first sub-image and the second sub-image, that an orientation of the second sensor matches the orientation of the sensor; and
   outputting, via the graphical user interface, a confirmation that the orientation of the second sensor matches the orientation of the first sensor.

3. The method of claim 2, further comprising:
   recording, using the second sensor, a measurement of the target; and
   storing, in the memory, the recorded measurement.

4. The method of claim 2, further comprising:
   identifying a portion of the second image including the second sensor;
   comparing the identified portion of the second image with the first sub-image; and
   determining that the identified portion of the second image matches the first sub-image.

5. The method of claim 1, further comprising displaying, via the GUI, a prompt for the user to re-record the first image in response to determining that the orientation of first sensor in the first image does not match the predetermined reference orientation.

6. The method of claim 1, further comprising, prior to the recording operation:
receiving, via a radio frequency identification reader, a unique identifier of the target from a radio frequency identification tag corresponding to the target;
receiving, from the memory, the predetermined reference orientation associated with the unique identifier;
determining that the first image is not present in the memory; and
outputting, via the GUI, a prompt to record the first image in response to determining that the first image is not present in the memory.

7. The method of claim 1, further comprising identifying, using wavelet analysis, the first sensor in the first image.

8. A system comprising:
at least one data processor;
a memory storing instructions which, when executed by the at least one data processor, causes the at least one data processor to perform operations comprising:
recording, using a camera, a first image at a first resolution, wherein the first image includes a first sensor placed on a target;
determining, using an accelerometer, an orientation of the first image concurrently with the recording of the first image, wherein the orientation of the first image is associated with an orientation of the first sensor placed on the target within the first image;
receiving, via a graphical user interface (GUI), a user input indicating a boundary surrounding the first sensor in a portion of the first image;
comparing the orientation of the first sensor within the first image with a predetermined reference orientation;
determining whether the orientation of the first sensor within the first image matches the predetermined reference orientation;
storing, in the memory in response to determining that the orientation of the first sensor matches the predetermined reference orientation, a first sub-image derived from the first image, a second sub-image derived from the first image, and the orientation of the first sensor, wherein the first sub-image is the portion of the first image surrounded by the boundary at the first resolution, wherein the second sub-image is the first image at a second resolution, and wherein the second resolution is less than the first resolution; and
outputting, via the GUI, a confirmation that the orientation of the first sensor within the first image matches the predetermined reference orientation.

9. The system of claim 8, wherein the operations performed by the at least one data processor further include:
receiving, from the memory, the first sub-image, the second sub-image, and the orientation of the first sensor;
recording, using the camera, a second image, wherein the second image includes a second sensor placed on the target;
comparing the second image to the first sub-image and the second sub-image;
determining whether the second image matches the first sub-image and the second sub-image;
determining, in response to determining that the second image matches the first sub-image and the second sub-image, that an orientation of the second sensor matches the orientation of the first sensor; and
outputting, via the GUI, a confirmation that the orientation of the second sensor matches the orientation of the first sensor.

10. The system of claim 9, wherein the operations performed by the at least one data processor further include:
recording, using the second sensor, a measurement of the target; and
storing, in the memory, the recorded measurement.

11. The system of claim 9, wherein the operations performed by the at least one data processor further include:
identifying a portion of the second image including the second sensor;
comparing the identified portion of the second image with the first sub-image; and
determining that the identified portion of the second image matches the first sub-image.

12. The system of claim 8, wherein the operations performed by the at least one data processor further include displaying, via the GUI, a prompt for the user to re-record the first image including the first sensor placed on the target in response to determining that the orientation of the first image does not match the predetermined reference orientation.

13. The system of claim 8, wherein the operations performed by the at least one data processor further include, prior to the recording operation:
receiving, via a radio frequency identification reader, a unique identifier of the target from a radio frequency identification tag corresponding to the target;
receiving, from the memory, the predetermined reference orientation associated with the unique identifier;
determining that the first image is not present in the memory; and
outputting, via the GUI, a prompt to record the first image in response to determining that the first image is not present in the memory.

14. The system of claim 8, wherein the operations performed by the at least one data processor further include identifying, using wavelet analysis, the first sensor in the first image.

15. A non-transitory computer program product storing instructions, which when executed by at least one data processor of at least one computing system, implement operations comprising:
recording, using a camera, a first image at a first resolution that includes a first sensor placed on a target;
determining, using an accelerometer, an orientation of the first image concurrently with the recording of the first image, wherein the orientation of the first image is associated with an orientation of the first sensor placed on the target within the first image;
receiving, via a graphical user interface (GUI), a user input indicating a boundary surrounding the first sensor in a portion of the first image;
comparing the orientation of the first sensor within the first image with a predetermined reference orientation;
determining whether the orientation of the first sensor within the first image matches the predetermined reference orientation;
storing, in a memory in response to determining that the orientation of the first sensor within the first image matches the predetermined reference orientation, a first sub-image derived from the first image, a second sub-image derived from the first image, and the orientation of the first sensor, wherein the first sub-image includes the portion of the first image surrounded by the boundary at the first resolution, wherein the second sub-image is the first image at a second resolution, and wherein the second resolution is less than the first resolution; and outputting, via the GUI, a confirmation that the orientation of the first sensor within the first image matches the predetermined reference orientation.

16. The non-transitory computer program product of claim 15, wherein the operations further comprise:

receiving, from the memory, the first sub-image, the second sub-image, and the orientation of the first sensor;

recording, using the camera, a second image, wherein the second image includes a second sensor placed on the target;

comparing the second image to the first sub-image and the second sub-image;

determining whether the second image matches the first sub-image and the second sub-image;

determining, in response to determining that the second image matches the first sub-image and the second sub-image, that an orientation of the second sensor matches the orientation of the first sensor; and outputting, via the GUI, a confirmation that the orientation of the second sensor matches the orientation of the first sensor.

17. The non-transitory computer program product of claim 16, wherein the operations further comprise:

recording, using the second sensor, a measurement of the target; and storing, in the memory, the recorded measurement.

18. The non-transitory computer program product of claim 16, wherein the operations further comprise:

identifying a portion of the second image including the second sensor;

comparing the identified portion of the second image with the first sub-image; and determining that the identified portion of the second image matches the first sub-image.

19. The non-statutory computer program product of claim 16, wherein the operations comprise include displaying, via the GUI, a prompt for the user to record the first image including the first sensor placed on the target in response to determining that the orientation of the first image does not match the predetermined reference orientation.

20. The non-transitory computer program product of claim 16, wherein the operations further comprise:

receiving, via a radio frequency identification reader, a unique identifier of the target from a radio frequency identification tag corresponding to the target;

receiving, from the memory, the predetermined reference orientation associated with the unique identifier;

determining that the first image is not present in the memory; and outputting, via the GUI, a prompt to record the first image in response to determining that the first image is not present in the memory.

21. The non-transitory computer program product of claim 15, wherein the operations further comprise identifying, using wavelet analysis, the sensor in the first image.

* * * * *